US006816837B1

United States Patent
Davis

(10) Patent No.: US 6,816,837 B1
(45) Date of Patent: Nov. 9, 2004

(54) VOICE MACROS FOR SCANNER CONTROL

(75) Inventor: Kenneth P. Davis, Brighton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 718 days.

(21) Appl. No.: 09/306,469

(22) Filed: May 6, 1999

(51) Int. Cl.[7] .............................................. G10L 15/22
(52) U.S. Cl. ..................................................... 704/275
(58) Field of Search ........................................ 704/275

(56) References Cited

U.S. PATENT DOCUMENTS

| | | | | |
|---|---|---|---|---|
| 5,430,558 A | | 7/1995 | Sohaei et al. ............... | 358/473 |
| 5,873,064 A | * | 2/1999 | De Armas et al. .......... | 704/275 |
| 5,995,936 A | * | 11/1999 | Brais et al. ................. | 704/275 |
| 6,083,270 A | * | 7/2000 | Scott ........................... | 703/24 |
| 6,199,044 B1 | * | 3/2001 | Ackley et al. .............. | 704/275 |

* cited by examiner

Primary Examiner—Tālivaldis Ivars Šmits

(57) ABSTRACT

A voice controlled capture device contains a processor that receives voice macros to control its operation. The capture device receives voice input, digitizes and sends the input to a second processor in a host computer system where speech recognition software within the host computer interprets the voice input to select a macro, and returns commands from the macro to the capture device where they are executed. Utilizing an interface or macro recorder within the capture device, and the speech recognition software within the host computer, the user can create voice macros incorporating individual voice commands. In a second embodiment, the capture device both analyzes the voice input and executes the commands of the macro.

38 Claims, 9 Drawing Sheets

VOICE MACROS FOR SCANNER CONTROL

TECHNICAL FIELD

This invention relates to voice controlled capture devices such as flatbed scanners, hand-held scanners, or digital scanning cameras. Even more particularly, the invention relates to voice macros for control input for voice controlled capture devices such as flatbed scanners, hand-held scanners, or digital scanning cameras.

BACKGROUND OF THE INVENTION

Voice controlled capture devices hold several advantages over similar non voice controlled capture devices. One advantage is increased user productivity. It is faster to give a voice command to control the capture device than navigating through the capture device user interface with a mouse and browsing through menus to find the proper scanner control command. Another advantage of voice control is that portable capture devices can be made smaller because many of the user input buttons can be eliminated, reducing the physical space required for the capture device.

In some situations, a user may have certain repetitive or frequent tasks to perform that require saying the same group of voice commands. Though giving voice commands is faster than using a traditional mouse navigable or keyboard oriented capture device user interface, it is still not productive or efficient to have to repeat the same set of voice commands each time a particular recurring task needs to be performed.

It is thus apparent that there is a need in the art for an improved method or apparatus which would eliminate the need to repeat the same set of voice commands for a particular recurring task. The present invention meets these and other needs in the art.

SUMMARY OF THE INVENTION

It is an aspect of the present invention to utilize voice macros to control the operation of a voice controlled capture device.

It is another aspect of the invention to utilize voice macros to control the operation of a voice controlled capture device in communication with a host computer.

Yet another aspect of the invention is to create voice macros through a macro recorder for a voice controlled capture device.

Still another aspect of the invention is to create voice macros through a capture device user interface in a voice controlled capture device in communication with a host computer.

A further aspect of the invention is to create voice macros by storing the individual voice commands as digital signals in an audio file format within a voice macro command file.

A still further aspect of the invention is to create voice macros by processing each voice command with voice analysis software and storing the command number or command text associated with each voice command within a voice macro command file.

Another aspect of the invention is to output an indication of no match when the voice macro command given by a user does not match any of the stored voice macro commands.

The above and other aspects of the invention are accomplished in a voice controlled capture device that receives voice macros to control its operation. A user identifies a task or tasks that require two or more voice commands to complete. Utilizing a capture device user interface or macro recorder, the user creates a voice macro incorporating the individual voice commands. Each voice command in the set is spoken, captured, and stored in a voice macro command file in memory. A unique voice macro command is pronounced, usually a word or short phrase that has meaning to the user, which is then associated with the voice macro command file containing the set of voice commands. To invoke the voice macro command, the user pronounces the unique voice macro command word or phrase, which is picked up by the capture device through a voice pickup component located in the capture device. Speech recognition software interprets the word or phrase and retrieves the voice macro command file containing the individual voice commands, which are then executed one after the other.

For example, a user may routinely scan documents to capture text and then incorporate the captured text into a new document utilizing a word processor, a typical optical character recognition (OCR) task. In using a voice controlled capture device, several voice commands need to be repeated each time this task is performed, making it ideal for a voice macro command. Using the capture device user interface or macro recorder, the user would speak each of the following voice commands recognized by the voice controlled capture device: "set color black and white", "set dpi 150", "set sharpening medium", "set type text", "scan", and "send to word". The user next pronounces the word or phrase the user wants to use to invoke the above set of voice commands. In this example, the letters "OCR" pronounced by the user would be a good choice for the phrase to use to invoke the voice macro. The set of captured voice commands are associated with the voice macro command phrase "OCR". The next time the user wants to perform this task, all the user has to do is speak the voice macro command phrase "OCR".

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
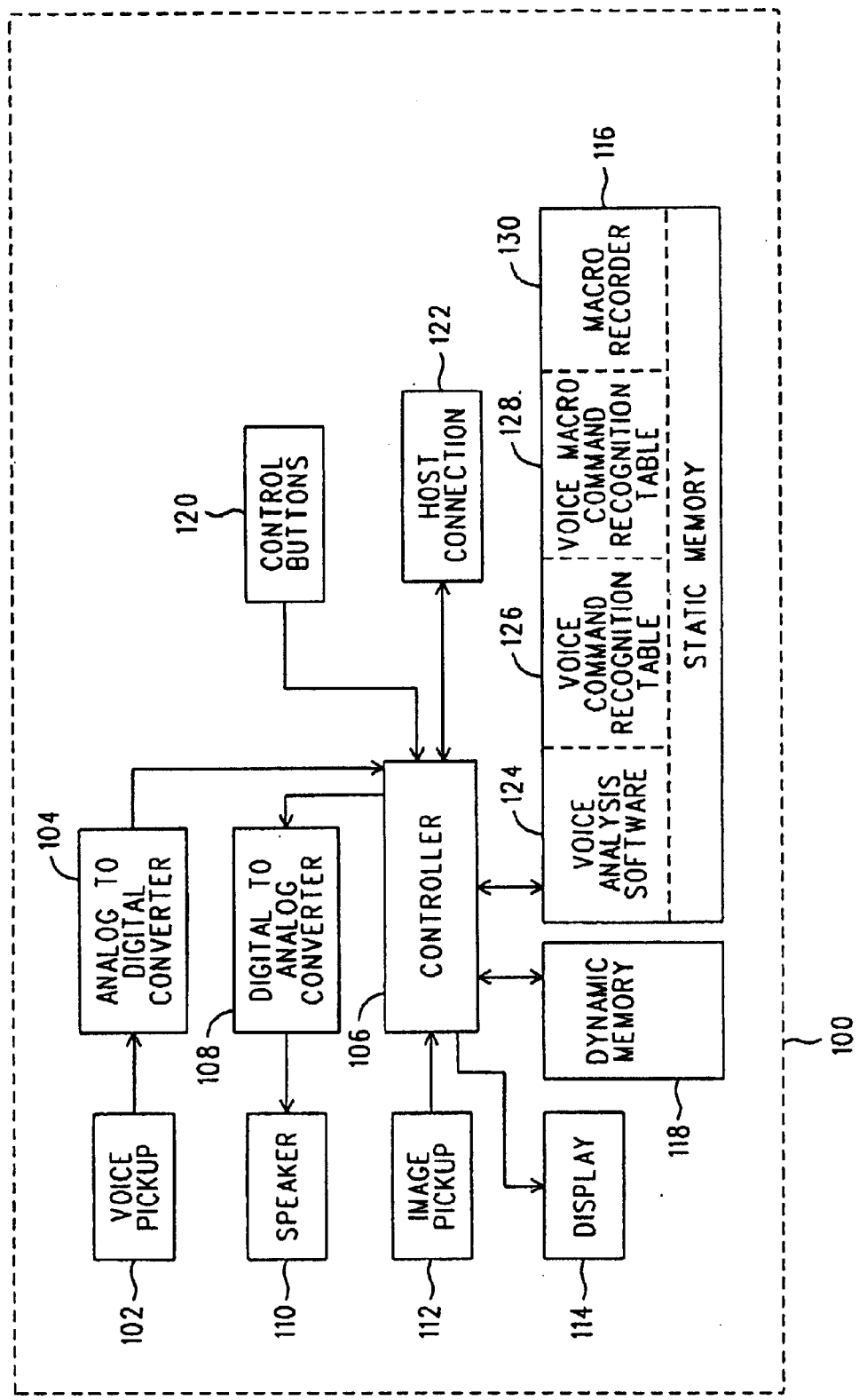
FIG. 1 shows a block diagram of a voice controlled capture device incorporating the voice macros of the present invention.

FIG. 1 shows a block diagram of a voice controlled capture device incorporating the voice macros of the present invention. The voice controlled capture device may be portable or stationary, and may have all of its functionality self-contained, referred to as a stand alone unit, or may require connectivity with a host computer having a capture device user interface to access some or all of its functionality, referred to as a connected unit. The voice controlled capture device may be a document scanner, a digital scanning camera, or some other type of capture device. The voice controlled capture device depicted in FIG. 1 is portable and is a stand alone unit. Referring now to FIG. 1, voice controlled capture device 100 is powered on by pressing a power on button, which is one of several control buttons 120 on voice controlled capture device 100. Voice controlled capture device 100 receives its power from internal batteries (not shown in FIG. 1), or through a power cable (also not shown in FIG. 1) connected to voice controlled capture device 100 and plugged into a power source.

A user manipulates voice controlled capture device 100 such that image pickup component 112 can capture a desired image. Controller 106 receives the data from the captured image from image pickup component 112, and may output the data to display 114, which is connected to controller 106, showing a visual representation of the captured image. Through host connection 122, voice controlled capture device 100 may transfer the data from a captured image to a host computer, or receive data and instructions from a host computer.

Voice macros for controlling voice controlled capture device 100 are spoken by a user speaking in close enough proximity to be picked up by voice pickup component 102, which is typically a microphone. Voice pickup component 102 converts the user's speech into an analog signal. Connected to voice pickup component 102 is an analog-to-digital converter 104, which converts the analog signal generated by voice pickup component 102 into a digital signal. The digital signal is sent by analog-to-digital converter 104 to controller 106, which saves the signal in dynamic memory 118, which is connected to controller 106. Controller 106 then calls voice analysis software 124 stored in static memory 116 to perform a series of frequency domain transforms on the digital signal stored in dynamic memory 118. Voice analysis software 124 generates a recognition pattern, which is a spectral transform, that is compared to recognition patterns (also spectral transforms) for voice macro commands stored in voice macro command recognition table 128 in static memory 116. One skilled in the art will recognize that any other suitable method for recognizing voice patterns could be used in the present invention instead of spectral transforms.

If there is a match between the recognition pattern generated and one of the recognition patterns for voice macro commands stored in voice macro command recognition table 128, then controller 106 retrieves the voice macro command file linked to the recognition pattern in voice macro command recognition table 128. Each of the voice commands listed in the voice macro command file are accessed by controller 106 and executed one after the other. The list of voice commands comprising a voice macro command file are derived from predefined voice commands for voice controlled capture device 100. The recognition patterns for the predefined voice commands are stored in voice command recognition table 126 in static memory 116. Each voice command recognition pattern is linked to a voice command file which may have one or more instructions that will be executed upon invoking the voice command.

Voice macro commands are created by utilizing macro recorder 130, which is stored in static memory 116. Macro recorder 130 is activated by the user through speaking a voice command, such as "Create Macro", or through pressing one of the several control buttons 120. The user then speaks the one or more voice command words, from the predefined voice commands available in voice command recognition table 126, that the user wishes to group together in a voice macro command. After speaking the last voice command word, the user then speaks the word or words that the user wishes to use to invoke the voice macro command. Voice analysis software 124 performs a series of frequency domain transforms on the digital signal resulting from the user speaking the voice macro command word or words. Voice analysis software 124 then generates a recognition pattern, which is a spectral transform of the digital signal derived from the voice macro command word or words, and stores the recognition pattern in voice macro command recognition table 128.

The user may request that voice controlled capture device 100 play back in audio format a stored voice macro command to verify the individual voice commands it contains. Controller 106 retrieves the voice macro command requested from voice macro command recognition table 128 and passes it to digital-to-analog converter 108, which converts the digital signal to an analog signal, and passes the analog signal to speaker 110, which generates audio output. For a voice controlled capture device 100 that is a connected unit, voice analysis software 124, voice command recognition table 126, voice macro command recognition table 128, and macro recorder 130 or an equivalent function, may be located in a host computer and accessed with a capture device user interface in the host computer.

Figure 2:
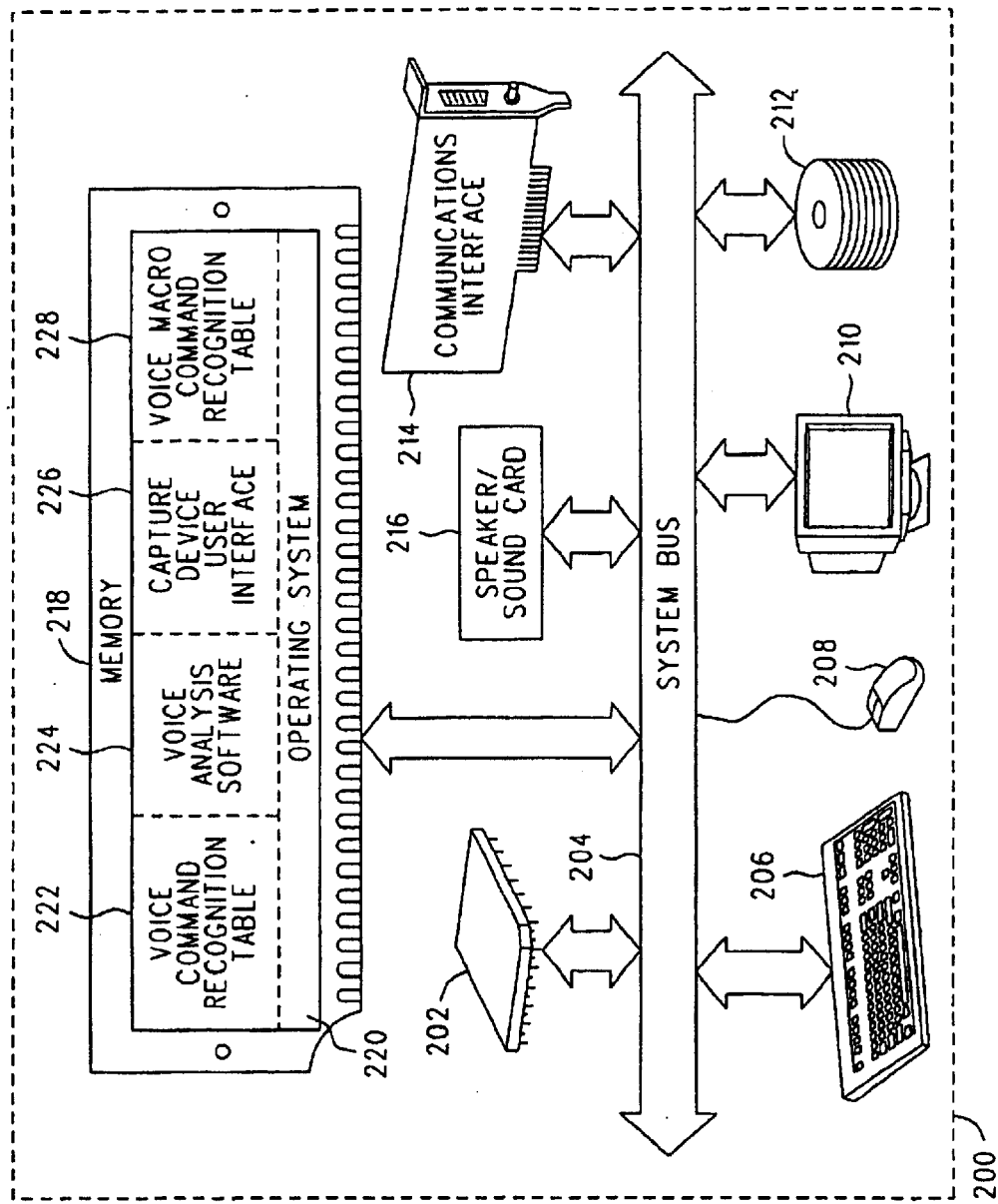
FIG. 2 shows a block diagram of a host computer system presenting a capture device user interface for a connected unit incorporating the voice macros of the present invention.

FIG. 2 shows a block diagram of a host computer system presenting a capture device user interface for a connected unit incorporating the voice macros of the present invention. The connected unit used in conjunction with the host computer system of FIG. 2 is the same as that of FIG. 1 except that voice analysis software 124, voice command recognition table 126, voice macro command recognition table 128, and macro recorder 130 are not contained within static memory 116. Referring now to FIG. 2, host computer system 200 contains a processing element 202. Processing element 202 communicates to other elements of host computer system 200 over a system bus 204. A keyboard 206 allows a user to input information into host computer system 200 and a graphics display 210 allows host computer system 200 to output information to the user. A graphical input device 208, typically a mouse, is also used to input information, and a storage device 212 is used to store data and programs within host computer system 200. Communications interface 214, also connected to system bus 204, sends and receives information to and from voice controlled capture device 100 through host connection 122 (FIG. 1). Speaker/sound card 216, connected to system bus 204, outputs audio information to the user. Some host computer systems may not have a sound card, in which case the speaker is driven only by software. A memory 218, also attached to system bus 204, contains an operating system 220, voice command recognition table 222, voice analysis software 224, capture device user interface 226, and voice macro recognition table 228.

Voice macro commands are created by utilizing capture device user interface 226, which may be a mouse navigable, keyboard oriented, or voice activated user interface. After activating capture device user interface 226 and powering on the connected unit, a user may create a voice macro by selecting a Create Macro option from a menu utilizing keyboard 206, graphical input device 208, or through speaking a voice command, such as "Create Macro", into voice pickup component 102 (FIG. 1). One skilled in the art will recognize that host computer system 200 may also have a voice pickup component that could be used. The user then speaks the one or more voice command words, from the predefined voice commands available in voice command recognition table 222, that the user wishes to group together in a voice macro command. After speaking the last voice command word, the user then speaks the word that the user wishes to use to invoke the voice macro command. Voice analysis software 224 performs a series of frequency domain transforms on the digital signal resulting from the user speaking the voice macro command word or words. Voice analysis software 224 then generates a recognition pattern, which is a spectral transform, for the voice macro command word, and stores the recognition pattern in voice macro command recognition table 228.

Voice macros for controlling voice controlled capture device 100 are spoken by a user speaking in close enough proximity to be picked up by voice pickup component 102. Voice pickup component 102 converts the user's speech into an analog signal. Connected to voice pickup component 102 is an analog-to-digital converter 104, which converts the analog signal generated by voice pickup component 102 into a digital signal. The digital signal is sent by analog-to-digital converter 104 to controller 106, which saves the signal in dynamic memory 118, which is connected to controller 106. Controller 106 then transfers the digital signal through host connection 122 (FIG. 1) to communications interface 214. The digital signal is transferred over system bus 204 to memory 218. Voice analysis software 224 stored in memory 218 then performs a series of frequency domain transforms on the digital signal stored in memory 218. Voice analysis software 224 generates a recognition pattern, which is a spectral transform, that is compared to recognition patterns (also spectral transforms) for voice macro commands stored in voice macro command recognition table 228 in memory 218.

If there is a match between the recognition pattern generated and one of the recognition patterns for voice macro commands stored in voice macro command recognition table 228, then capture device user interface 226 accesses the group of voice commands in the voice macro command file associated with the matching recognition pattern. Each of the voice commands listed in the voice macro command file are accessed by capture device user interface 226 and sent to the connected unit, where controller 106 executes them one after the other. The list of voice commands within a voice macro command file are derived from predefined voice commands for voice controlled capture device 100 that are stored in voice command recognition table 222 in memory 218. Each recognition pattern for a voice command is linked to a voice command file that has one or more instructions that will be executed upon invoking the voice command.

Figure 3:
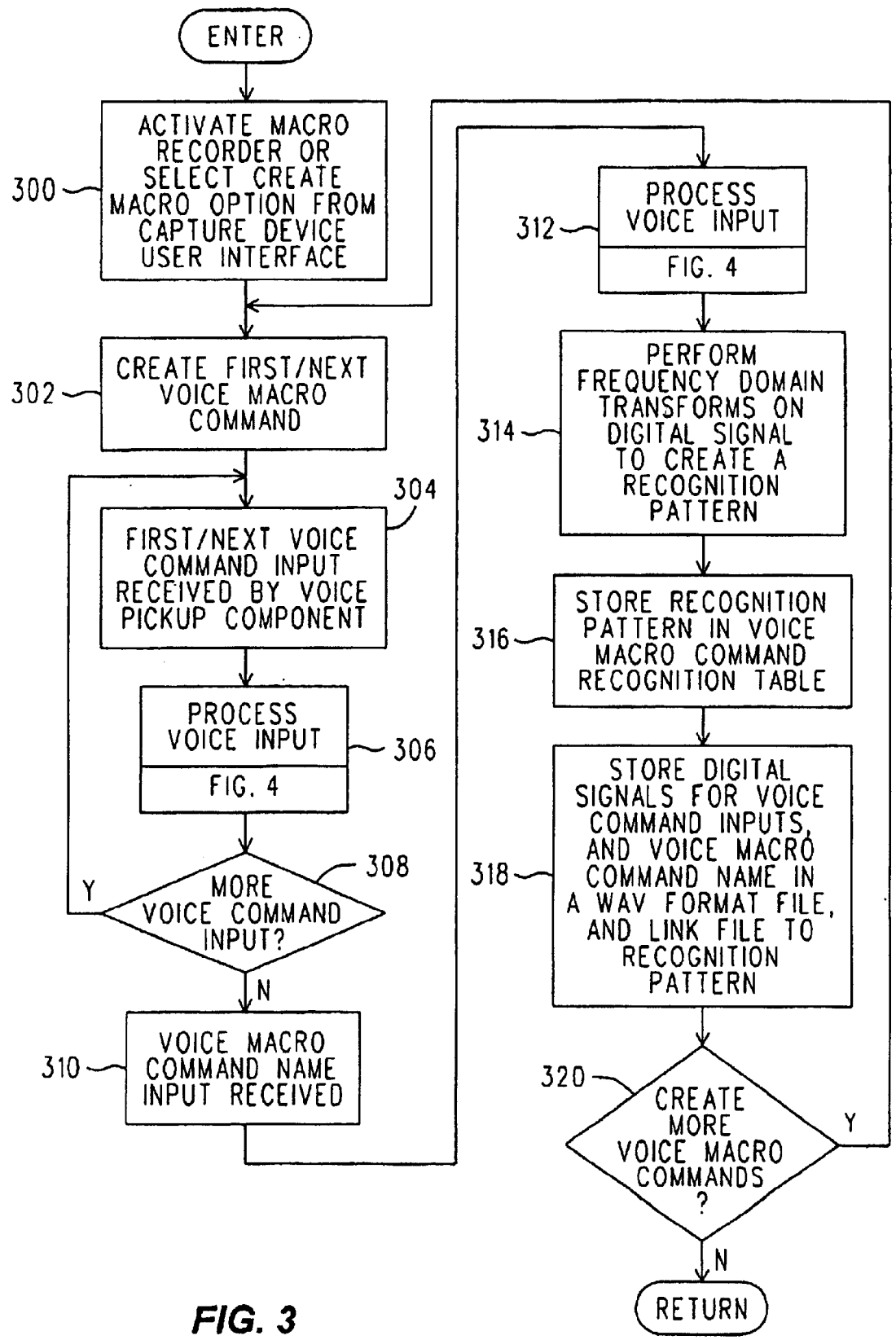
FIG. 3 shows a flowchart for creating the voice macros of the present invention without processing the voice commands with voice analysis software.

FIG. 3 shows a flowchart for creating the voice macros of the present invention without processing the voice commands with voice analysis software. Referring now to FIG. 3, in step 300, for a stand alone unit, macro recorder 130 is activated by issuing a voice command or pressing one of the several control buttons 120 (FIG. 1). Alternatively, for a connected unit, a Create Macro option can be selected using keyboard 206 or graphical input device 208 from menus presented on graphics display 210 through capture device user interface 226 (FIG. 2). In step 302 the creation of a first voice macro command begins, for a stand alone unit, by an audio prompt presented to the user by macro recorder 130 through speaker 110, or, for a connected unit, through a prompt presented to the user on graphics display 210 through capture device user interface 226, to speak a first voice command.

In step 304 voice input for a first voice command is received by voice pickup component 102 (FIG. 1) from the user. Step 306 calls FIG. 4 to process the voice input received in step 304. After returning from FIG. 4, step 308 determines if more voice commands are to be received. This may also be accomplished, for a stand alone unit, through an audio prompt presented to the user by macro recorder 130 through speaker 110, or, for a connected unit, through a prompt presented to the user on graphics display 210 through capture device user interface 226, to add another voice command to the group. If more voice commands are to be received, control returns to step 304. If the answer in step 308 is no, then in step 310 the user is prompted to give voice input for a name for the voice macro command being created, and the voice input is received by voice pickup component 102.

In step 312, FIG. 4 is called again to process the voice input received in step 310. After returning from FIG. 4, in step 314, for a stand alone unit, voice analysis software 124, or, for a connected unit, voice analysis software 224, performs frequency domain transforms on the digital signal stored in step 404 for the voice input for the voice macro command word or phrase received in step 310, creating a recognition pattern. In step 316 the recognition pattern created in step 314 is stored in voice macro command recognition table 128 for a stand alone unit, or for a connected unit, is stored in voice macro command recognition table 228. In step 318 the digital signals from the voice command voice inputs, and the digital signal from the voice macro command word or phrase voice input, are stored in a voice macro command file in an industry standard audio file format, such as a WAV file. For a stand alone unit, the WAV file is stored in static memory 116 and the WAV file is then linked to the recognition pattern for the voice macro command word or phrase stored in voice macro command recognition table 128. For a connected unit, the WAV file is stored in memory 218 and the WAV file is then linked to the recognition pattern for the voice macro command word or phrase stored in voice macro command recognition table 228.

Step 320 determines if input is received to create a next voice macro command. If yes, control returns to step 302. If the determination in step 320 is no, then control returns to controller 106 for a stand-alone unit, or for a connected unit, to capture device user interface 226.

Figure 4:
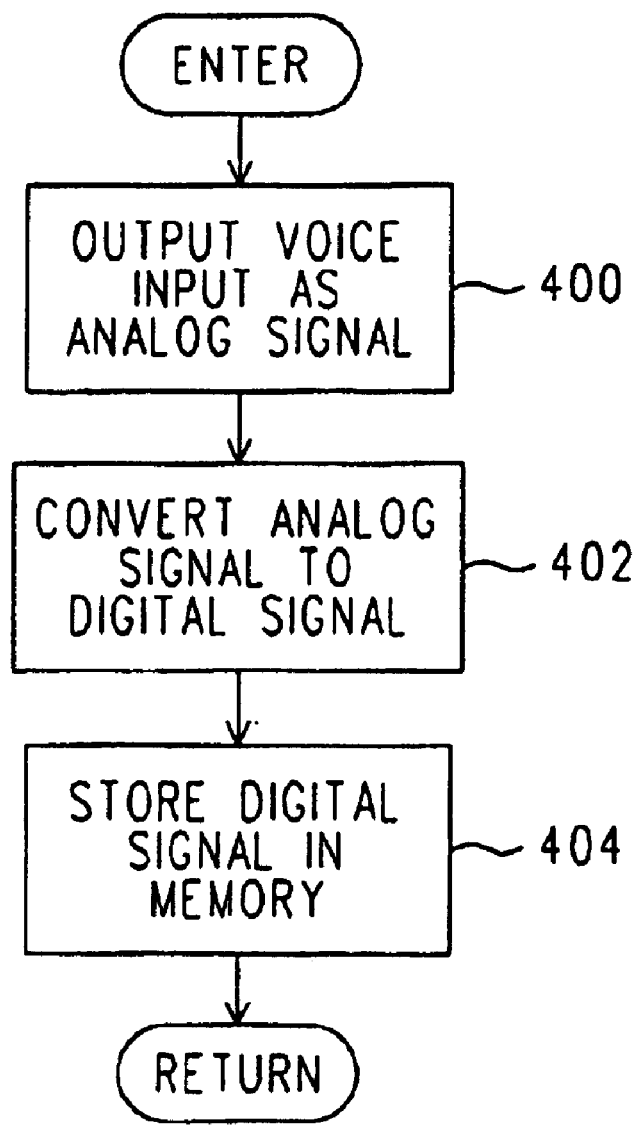
FIG. 4 shows a flowchart for processing voice input for creating the voice macros of the present invention without voice analysis of the voice commands.

FIG. 4 shows a flowchart for processing voice input for creating the voice macros of the present invention without voice analysis of the voice commands. Referring now to FIG. 4, in step 400 the voice command voice input captured by voice pickup component 102 (FIG. 1) in step 304 is output by voice pickup component 102 as an analog signal. In step 402 analog-to-digital converter 104 (FIG. 1) receives as input the analog signal, converts the analog signal to a digital signal, and outputs the digital signal to controller 106 (FIG. 1). In step 404, controller 106 receives as input the digital signal, and stores the digital signal in dynamic memory 118 (FIG. 1) for a stand alone unit. For a connected unit, the digital signal is sent by controller 106 to host computer system 200 through host connection 122, communications interface 214, and system bus 204 where the digital signal is stored in memory 218. Control then returns to step 308 in FIG. 3.

Figure 5:
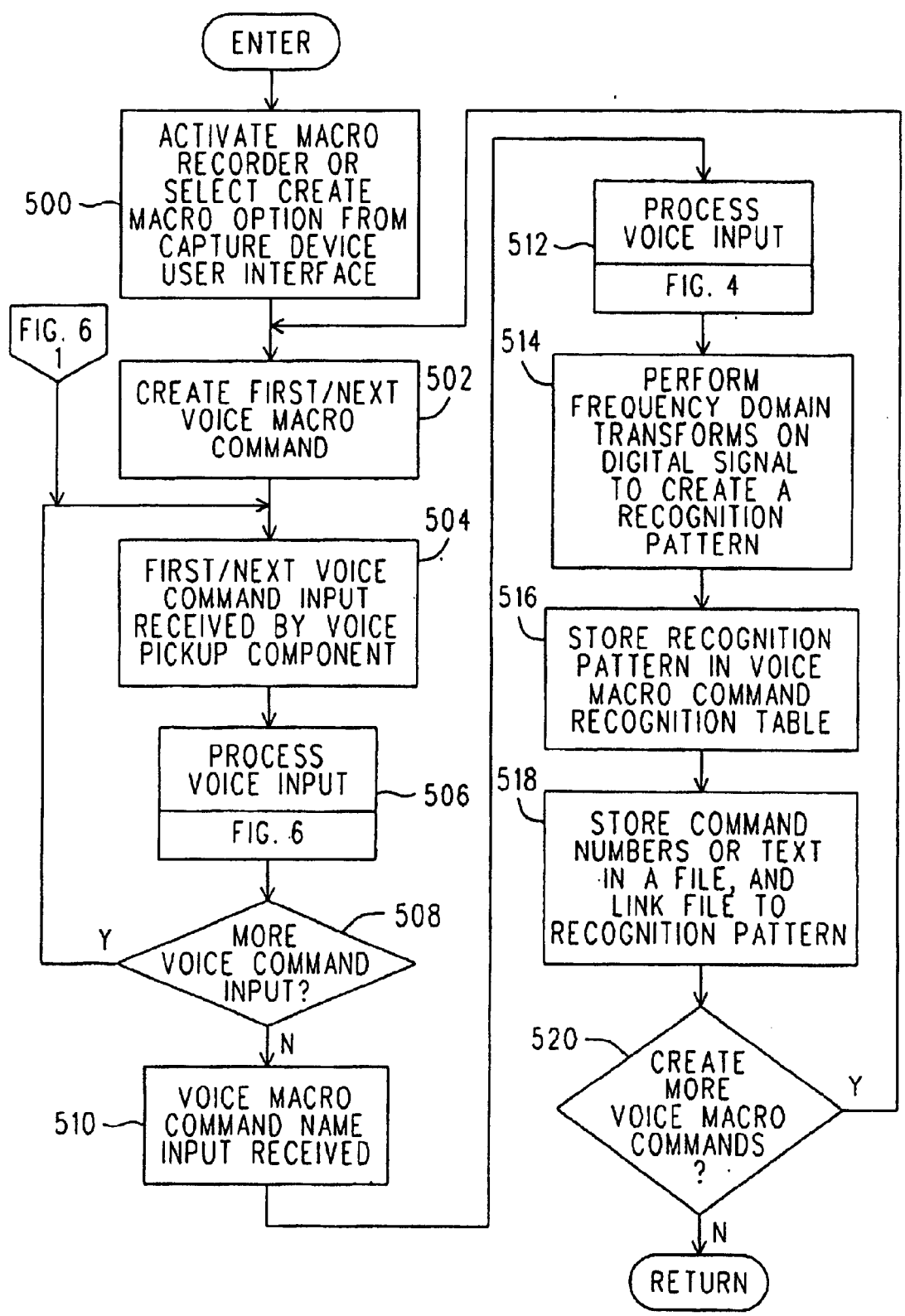
FIG. 5 shows a flowchart for creating the voice macros of the present invention by processing the voice commands with voice analysis software.

FIG. 5 shows a flowchart for creating the voice macros of the present invention by processing the voice commands with voice analysis software. Referring now to FIG. 5, in step 500, for a stand alone unit, macro recorder 130 is activated by issuing a voice command or pressing one of the several control buttons 120 (FIG. 1). Alternatively, for a connected unit, a Create Macro option can be selected using keyboard 206 or graphical input device 208 from menus presented on graphics display 210 through capture device user interface 226 (FIG. 2). In step 502 the creation of a first voice macro command begins. For a stand alone unit, an audio prompt is presented to the user by macro recorder 130 through speaker 110 to speak a first voice command. For a connected unit, a prompt is presented to the user on graphics display 210 through capture device user interface 226 to speak a first voice command.

In step 504 voice input for a first voice command is received by voice pickup component 102 (FIG. 1) from the user. Step 506 calls FIG. 6 to process the voice input received in step 504. After returning from FIG. 6, step 508 determines if more voice commands are to be received. This may also be accomplished, for a stand alone unit, through an audio prompt presented to the user by macro recorder 130 through speaker 110, or, for a connected unit, through a prompt presented to the user on graphics display 210 through capture device user interface 226, to add another voice command. If more voice commands are to be received, control returns to step 504. If the answer in step 508 is no, then in step 510 the user is prompted to give voice input for a name for the voice macro command being created, and the voice input is received by voice pickup component 102.

In step 512, FIG. 4 is called to process the voice input received in step 510. After returning from FIG. 4, in step 514, for a stand alone unit, voice analysis software 124, or, for a connected unit, voice analysis software 224, performs frequency domain transforms on the digital signal stored in step 404 for the voice input for the voice macro command word or phrase received in step 510, creating a recognition pattern. In step 516 the recognition pattern created in step 514 is stored in voice macro command recognition table 128 for a stand alone unit, or for a connected unit, is stored in voice macro command recognition table 228. In step 518 the command number or command text for the matched voice commands are stored in a voice macro command file. The command numbers or command text for the voice commands are linked to voice command files having predetermined sets of instructions. For a stand alone unit, the voice macro command file is stored in static memory 116 and is linked to the recognition pattern for the voice macro command word or phrase stored in voice macro command recognition table 128. For a connected unit, the voice macro command file is stored in memory 218 and is linked to the recognition pattern for the voice macro command word or phrase stored in voice macro command recognition table 228.

Step 520 determines if input is received to create a next voice macro command. If yes, control returns to step 502. If the determination in step 520 is no, then control returns to controller 106 for a stand-alone unit, or for a connected unit, to capture device user interface 226.

Figure 6:
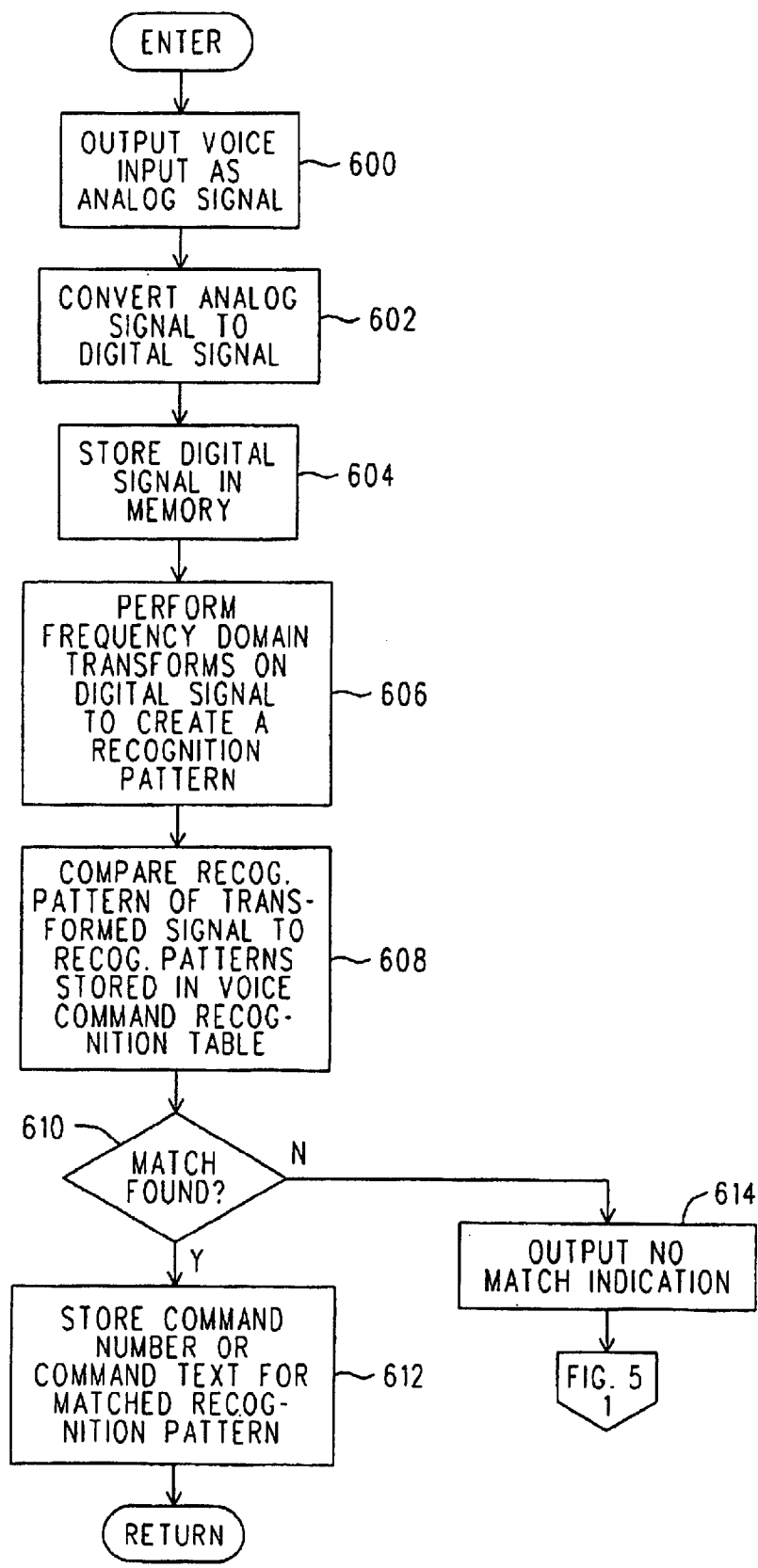
FIG. 6 shows a flowchart for processing voice input for creating the voice macros of the present invention by voice analysis of the voice commands.

FIG. 6 shows a flowchart for processing voice input for creating the voice macros of the present invention by voice analysis of the voice commands. Referring now to FIG. 6, in step 600 voice input for the voice command captured by voice pickup component 102 (FIG. 1) in step 504 is output by voice pickup component 102 as an analog signal. In step 602 analog-to-digital converter 104 (FIG. 1) receives as input the analog signal, converts the analog signal to a digital signal, and outputs the digital signal to controller 106 (FIG. 1). In step 604, controller 106 receives as input the digital signal, and stores the digital signal in dynamic memory 118 (FIG. 1) for a stand alone unit. For a connected unit, the digital signal is sent by controller 106 to host computer system 200 through host connection 122, communications interface 214, and system bus 204 where the digital signal is stored in memory 218.

In step 606, for a stand alone unit, voice analysis software 124, or, for a connected unit, voice analysis software 224, performs frequency domain transforms on the digital signal stored in step 604 for the voice command name voice input received in step 504, creating a recognition pattern. In step 608 the recognition pattern from step 606 is compared with any of the recognition patterns for voice commands stored in voice command recognition table 126 for a stand alone unit, or for a connected unit, voice command recognition table 222. Step 610 determines if a match was found in the comparison performed in step 610. If no match was found, step 614 outputs an indication of no match to the user, which may be an audible word or a specific beep pattern for a stand alone unit, or, for a connected unit, a message displayed on graphics display 210 with or without an audible beep pattern. Control then returns to step 504 where input for a next voice command is received.

If step 610 determines that a match was found in step 608, then control passes to step 612. The recognition patterns in the voice command recognition table have command numbers or command text that are linked to the voice command files having the predetermined sets of instructions. Step 612 stores the command number or command text from the matching recognition pattern in dynamic memory 118 for a stand alone unit, or for a connected unit, in memory 218. Control then returns to step 508 of FIG. 5.

Figure 7A:
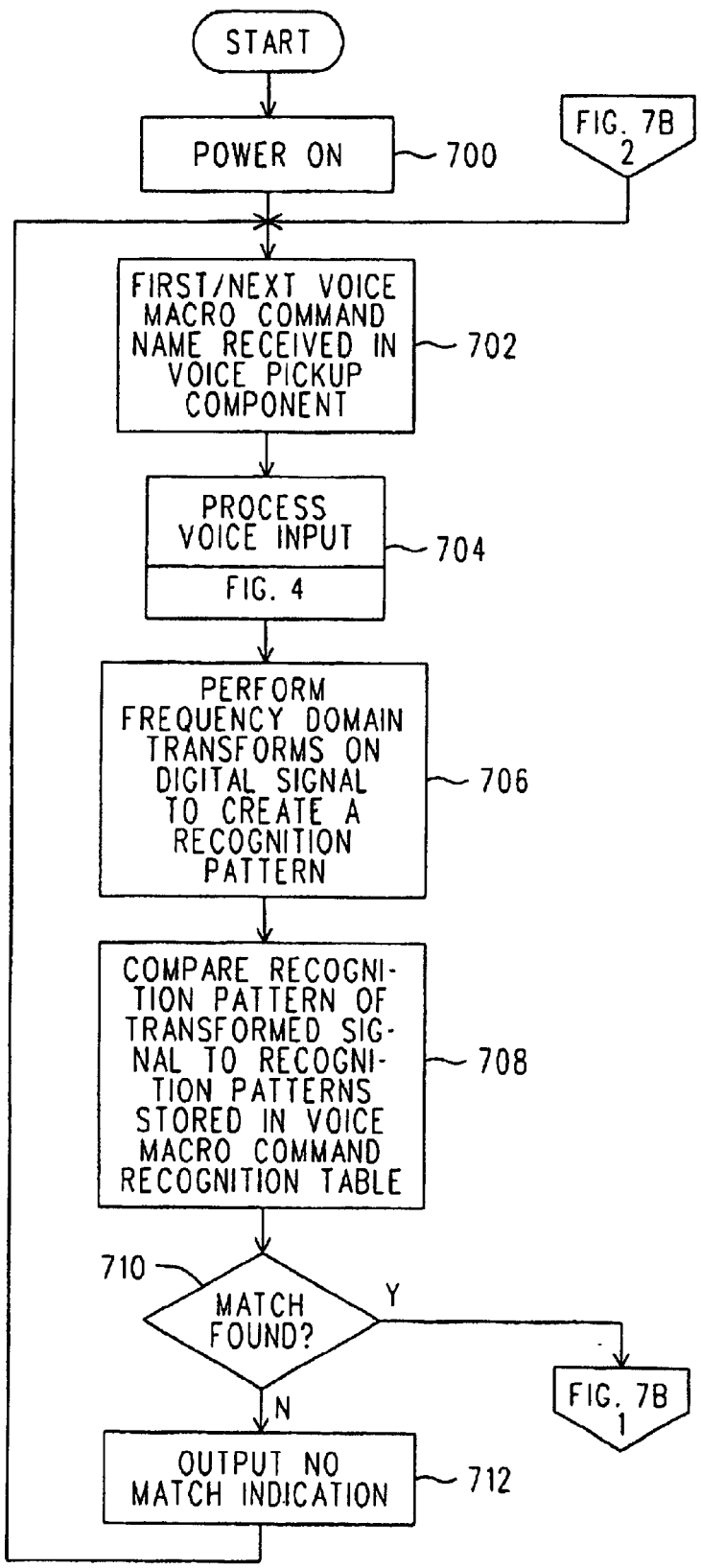
FIGS. 7A and 7B show a flowchart for utilizing a voice macro command as created in FIG. 3.
Figure 7B:
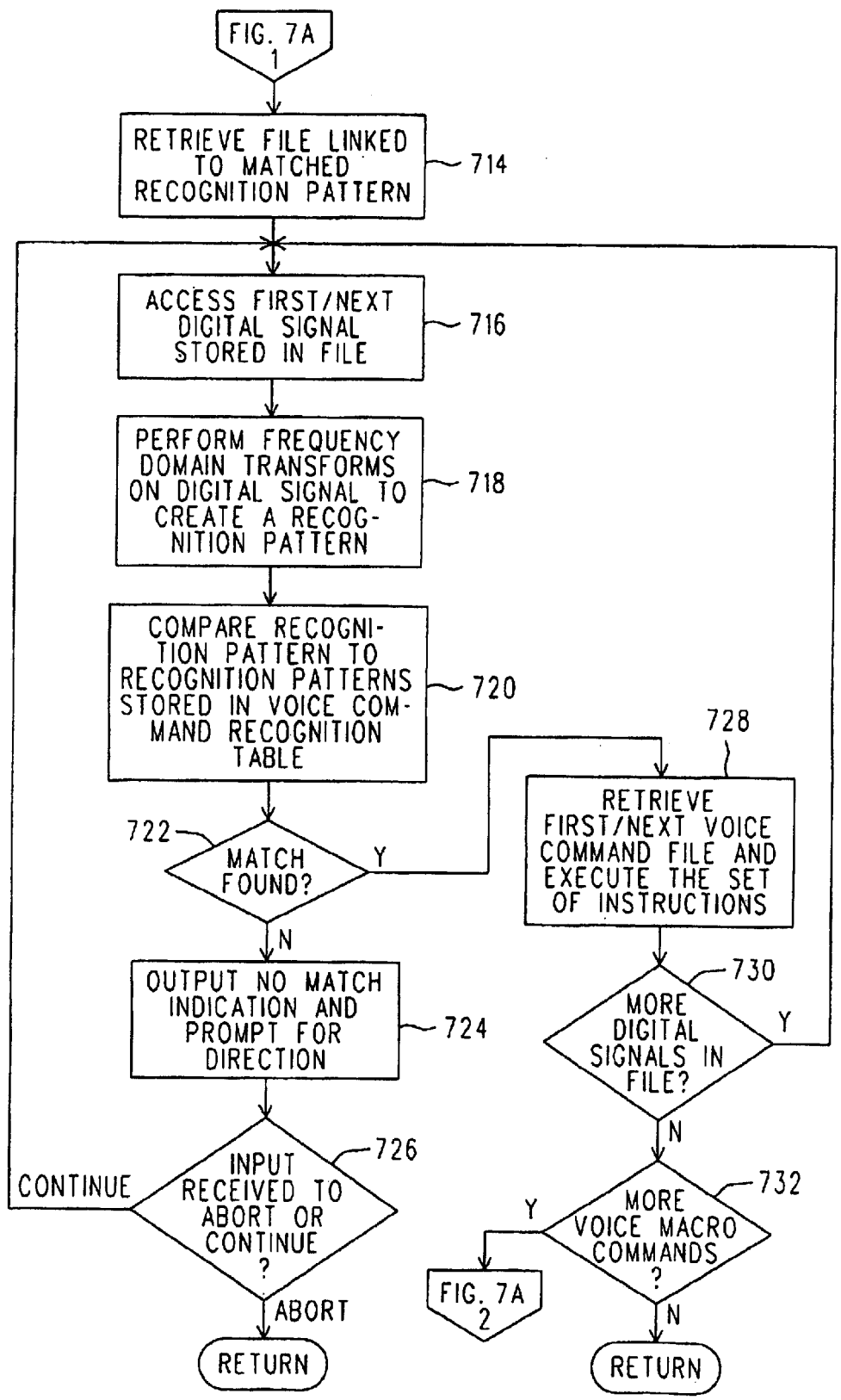

FIGS. 7A and 7B show a flowchart for utilizing a voice macro command as created in FIG. 3. Referring now to FIGS. 7A and 7B, in step 700 voice controlled capture device 100 is powered on by pressing a power on button, which is one of several control buttons 120 (FIG. 1). In step 702 a user speaks a first voice macro command word or phrase in close enough proximity to be picked up by voice pickup component 102 (FIG. 1). In step 704, FIG. 4 is called to process the voice input of the voice macro command word or phrase received in step 702. After returning from FIG. 4, in step 706, for a stand alone unit, voice analysis software 124, or, for a connected unit, voice analysis software 224, performs frequency domain transforms on the digital signal stored in step 404 for the voice input of the voice macro command word or phrase received in step 702, creating a recognition pattern. In step 708 the recognition pattern created in step 706 is compared with any of the recognition patterns for voice macro commands stored in voice macro command recognition table 128 for a stand alone unit, or for a connected unit, voice macro command recognition table 228. Step 710 determines if a match was found in the comparison performed in step 708. If no match was found, then step 712 outputs an indication of no match to the user, which may be an audible word or a specific beep pattern for a stand alone unit, or, for a connected unit, a message displayed on graphics display 210 with or without an audible beep pattern. Control then returns to step 702 where input for a next voice macro command is received.

If step 710 determines that a match was found in the comparison performed in step 708, then control passes to step 714, where the voice macro command file linked to the matched recognition pattern is retrieved. In step 716 the first digital signal stored in the voice macro command file representing a voice command name is accessed. In step 718, for a stand alone unit, voice analysis software 124, or, for a connected unit, voice analysis software 224, performs frequency domain transforms on the first digital signal accessed in step 716 creating a recognition pattern. In step 720 the recognition pattern created in step 718 is compared with any of the recognition patterns for voice commands stored in voice command recognition table 126 for a stand alone unit, or for a connected unit, voice command recognition table 222.

Step 722 determines if a match was found in the comparison performed in step 720. If no match was found, then step 724 outputs an indication of no match to the user, which may be an audible word or a specific beep pattern for a stand alone unit, or, for a connected unit, a message displayed on graphics display 210 with or without an audible beep pattern, and is prompted to give input on how to proceed. The user is prompted to abort further execution of the voice macro command, or to continue processing the remaining portions of the voice macro command. Step 726 determines if input is received from the user to continue or abort. If input is received to continue in step 726, then control returns to step 716 where the next digital signal stored in the voice macro command file is accessed. If the input received in step 726 is to abort, then control returns to voice controlled capture device 100 to receive other user input.

If step 722 determines that a match was found, then step 728 retrieves the voice command file linked to the matching recognition pattern that is stored in voice command recognition table 126 for a stand alone unit, or for a connected unit, stored in voice command recognition table 222. The set of instructions within the voice command file are then executed.

Step 730 determines if there are more digital signals in the voice macro command file to be processed. If yes, control returns to step 716 where the next digital signal is accessed. If the determination in step 730 is that there are no more digital signals to process, then step 732 determines if more voice macro commands are to be processed. If yes, control returns to step 702 where the next voice macro command word or phrase is received in voice pickup component 102. If the determination in step 732 is that there are no more voice macro commands to process, control returns to voice controlled capture device 100 to receive other user input.

Figure 8:
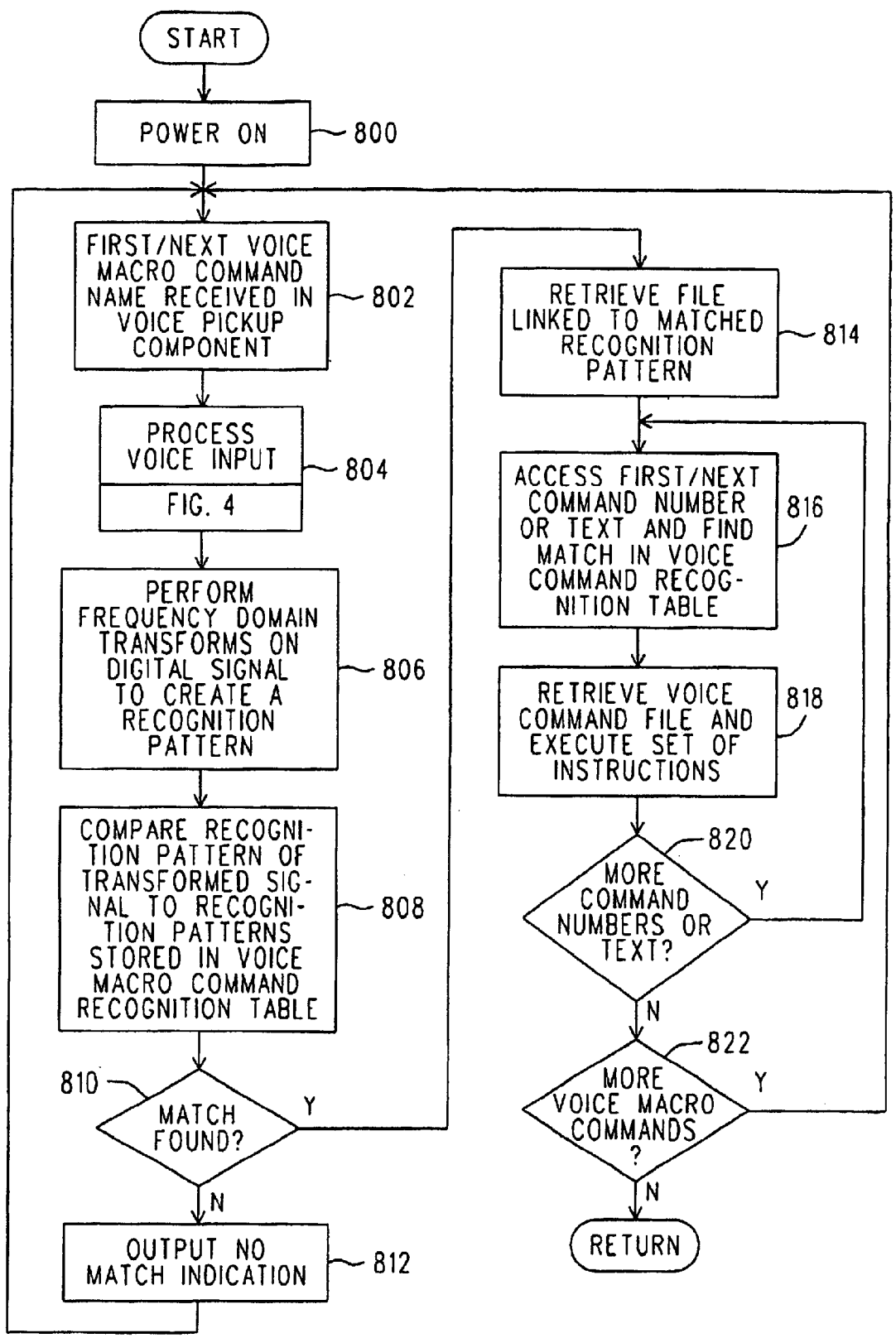
FIG. 8 shows a flowchart for utilizing a voice macro command as created in FIG. 5.

FIG. 8 shows a flowchart for utilizing a voice macro command as created in FIG. 5. Referring now to FIG. 8, in step 800 voice controlled capture device 100 is powered on by pressing a power on button, which is one of several control buttons 120 (FIG. 1). In step 802 a user speaks a first voice macro command word or phrase in close enough proximity to be picked up by voice pickup component 102 (FIG. 1). In step 804, FIG. 4 is called to process the voice input of the voice macro command word or phrase received in step 802. After returning from FIG. 4, in step 806, for a stand alone unit, voice analysis software 124, or, for a connected unit, voice analysis software 224, performs frequency domain transforms on the digital signal stored in step 404 for the voice input of the voice macro command word or phrase received in step 802, creating a recognition pattern. In step 808 the recognition pattern created in step 806 is compared with any of the recognition patterns for voice macro commands stored in voice macro command recognition table 128 for a stand alone unit, or for a connected unit, voice macro command recognition table 228. Step 810 determines if a match was found in the comparison performed in step 808. If no match was found, then step 812 outputs an indication of no match to the user, which may be an audible word or a specific beep pattern for a stand alone unit, or, for a connected unit, a message displayed on graphics display 210 with or without an audible beep pattern. Control then returns to step 802 where input for a next voice macro command is received.

If step 810 determines that a match was found in the comparison performed in step 808, then control passes to step 814, where the voice macro command file linked to the matched recognition pattern is retrieved. Step 816 accesses the first command number or command text in the voice macro command file and finds the matching command number or command text in the voice command recognition table 126 for a stand alone unit, or for a connected unit, stored in voice command recognition table 222. Step 818 retrieves the voice command file linked to the command number or command text and the set of instructions within the voice command file are executed.

Step 820 determines if there are more command numbers or command text in the voice macro command file to be processed. If yes, control returns to step 816 where the next command number or command text is accessed. If the determination in step 820 is that there are no more command numbers or command text to process, then step 822 determines if more voice macro commands are to be processed. If yes, control returns to step 802 where the next voice macro command word or phrase is received in voice pickup component 102. If the determination in step 822 is that there are no more voice macro commands to process, control returns to voice controlled capture device 100 to receive other user input.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A voice macro control method for a voice controlled capture device comprising the steps of:
    (a) receiving a first voice macro command voice input in a voice pickup component of said voice controlled capture device;
    (b) converting said first voice macro command voice input into a first digital signal and sending said first digital signal to a host processor;
    (c) converting, within said host processor, said first digital signal into a first recognition pattern;
    (d) comparing said first recognition pattern to at least one stored recognition pattern stored in a voice macro command recognition table;
    (e) when said first recognition pattern matches one of said at least one stored recognition patterns stored in said voice macro command recognition table, retrieving a voice macro command file linked to said one of said at least one stored recognition patterns, and sending said voice macro command file to said capture device;
    (f) accessing, within said capture device, at least one command number from said voice macro command file;
    (g) finding a matching command number in a voice command recognition table;
    (h) retrieving a first voice command file linked to said matching command number in said voice command recognition table; and
    (i) executing at least one instruction from said first voice command file.

2. The voice macro control method for a voice controlled capture device according to claim 1 wherein step (b) further comprises the steps of:
    (b1) converting said first voice macro command voice input into a first analog signal; and
    (b2) converting said first analog signal into said first digital signal.

3. The voice macro control method for a voice controlled capture device according to claim 1 wherein step (c) further comprises the step of:
    (c1) performing a plurality of frequency domain transforms on said first digital signal, wherein said plurality of frequency domain transforms generate said first recognition pattern, and further wherein said first recognition pattern is a spectral transform of said first digital signal.

4. The voice macro control method for a voice controlled capture device according to claim 1 wherein step (e) is replaced with the following new step (e) and steps (f), (g), (h), and (i) are not performed:
    (e) when said first recognition pattern does not match one of said at least one stored recognition patterns stored in said voice macro command recognition table, outputting an indication of no match.

5. The voice macro control method for a voice controlled capture device according to claim 1 wherein said at least one command number is at least one command text.

6. The voice macro control method for a voice controlled capture device according to claim 1 further comprising the step of:
    (j) repeating steps (f) through (i) for a plurality of command numbers from said voice macro command file.

7. The voice macro control method for a voice controlled capture device according to claim 1 further comprising the steps (a0a) through (a0k) performed before step (a):
    (a0a) activating a macro recorder to create a first voice macro command;
    (a0b) receiving at least one voice command voice input in said voice pickup component;
    (a0c) converting said at least one voice command voice input into a second digital signal, and sending said digital signal to a host processor;
    (a0d) converting, in said host processor, said second digital signal into a second recognition pattern;
    (a0e) comparing said second recognition pattern to at least one stored recognition pattern stored in said voice command recognition table;
    (a0f) when said second recognition pattern matches one of said at least one stored recognition patterns stored in said voice command recognition table, storing in a memory a first command number from said one of said at least one stored recognition patterns matching said second recognition pattern, wherein said first command number matches said at least one command number from said voice macro command file;
    (a0g) receiving, in said capture device, a first voice input to name said first voice macro command, wherein said first voice macro command voice input matches said first voice input;
    (a0h) converting said first voice input into a third digital signal, and sending said digital signal to said host processor;

(a0i) converting, in said host processor, said third digital signal into a first created recognition pattern, wherein said first recognition pattern matches said first created recognition pattern;

(a0j) storing said first created recognition pattern in said voice macro command recognition table; and (a0k) storing said first command number in said voice macro command file, wherein said voice macro command file is linked to said first created recognition pattern.

8. The voice macro control method for a voice controlled capture device according to claim 7 wherein step (a0f) is replaced by the following new step (a0f) and steps (a0g), (a0h), (a0i), (a0j), and (a0k) are not performed:

(a0f) when said second recognition pattern does not match one of said at least one stored recognition patterns stored in said voice command recognition table, outputting an indication of no match.

9. The voice macro control method for a voice controlled capture device according to claim 7 wherein said first command number is a first command text, and said at least one command number at least one command text.

10. The voice macro control method for a voice controlled capture device according to claim 7 wherein step (a0f) further comprises the step (a0f1):

(a0f1) repeating steps (a0b) through (a0f) for a plurality of voice command voice inputs.

11. The voice macro control method for a voice controlled capture device according to claim 7 further comprising the step of:

(a01) repeating steps (a0b) through (a0k) for a plurality of voice macro commands.

12. The voice macro control method for a voice controlled capture device according to claim 7 wherein step (a0a) is replaced with the following new step (a0a):

(a0a) selecting a create macro option from a capture device user interface loaded into a memory in a host computer system to create a first voice macro command, wherein said host computer system is in communication with said voice controlled capture device.

13. The voice macro control method for a voice controlled capture device according to claim 1 wherein step (f) is replaced with the following new step (f), step (g) is replaced with the following new step (g), step (h) is replaced with the following new step (h), step (i) is replaced with the following new step (i), and further comprising the new step (j):

(f) accessing at least one digital signal from said voice macro command file;

(g) converting said at least one digital signal into a second recognition pattern;

(h) comparing said second recognition pattern to at least one stored recognition pattern stored in a voice command recognition table;

(i) when said second recognition pattern matches one of said at least one stored recognition patterns stored in said voice command recognition table, retrieving a voice command file linked to said one of said at least one stored recognition patterns; and (j) executing at least one instruction from said first voice command file.

14. The voice macro control method for a voice controlled capture device according to claim 13 wherein step (g) further comprises the step of:

(g1) performing a plurality of frequency domain transforms on said at least one digital signal from said voice macro command file, wherein said plurality of frequency domain transforms generate said second recognition pattern, and further wherein said second recognition pattern is a spectral transform of said at least one digital signal.

15. The voice macro control method for a voice controlled capture device according to claim 13 wherein step (i) is replaced with the following new step (i), and step (j) is replaced with the following new step (j), and further comprising the new steps (k), (l), and (m):

(i) when said second recognition pattern does not match one of said at least one stored recognition patterns stored in said voice command recognition table, outputting an indication of no match;

(j) outputting a prompt requesting input to continue or input to abort;

(k) when said input to continue is received, performing step (l) and not step (m), and when said input to abort is received, performing step (m) and not step (l);

(l) repeating steps (f) through (k) for a next digital signal from said voice macro command file; and (m) ending said voice macro control method.

16. The voice macro control method for a voice controlled capture device according to claim 13 further comprising the step of:

(k) repeating steps (f) through (j) for a plurality of digital signals from said voice command file.

17. The voice macro control method for a voice controlled capture device according to claim 13 further comprising the steps (a0a) through (a0h) performed before step (a):

(a0a) activating a macro recorder to create a first voice macro command;

(a0b) receiving at least one voice command voice input in said voice pickup component;

(a0c) converting said at least one voice command voice input into a second digital signal;

(a0d) receiving a first voice input to name said first voice macro command, wherein said first voice macro command voice input matches said first voice input;

(a0e) converting said first voice input into a third digital signal;

(a0f) converting said third digital signal into a first created recognition pattern, wherein said first recognition pattern matches said first created recognition pattern;

(a0g) storing said first created recognition pattern in said voice macro command recognition table; and (a0h) storing said second digital signal in said voice macro command file, wherein said voice macro command file is linked to said first created recognition pattern.

18. The voice macro control method for a voice controlled capture device according to claim 17 wherein step (a0c) further comprises the step (a0c1):

(a0c1) repeating steps (a0b) through (a0c) for a plurality of voice command voice inputs.

19. The voice macro control method for a voice controlled capture device according to claim 17 further comprising the step of:

(a0i) repeating steps (a0b) through (a0h) for a plurality of voice macro commands.

20. The voice macro control method for a voice controlled capture device according to claim 17 wherein step (a0a) is replaced with the following new step (a0a):

(a0a) selecting a create macro option from a capture device user interface loaded into a memory in a host computer system to create a first voice macro command, wherein said host computer system is in communication with said voice controlled capture device.

21. A voice controlled capture system comprising:

a voice pickup component for receiving a first voice macro command voice input and converting said first voice macro command voice input into a first analog signal, said voice pickup component being contained in a voice capture device;

an analog-to-digital converter connected to said voice pickup component for receiving and converting said first analog signal into a first digital signal;

a controller connected to said analog-to-digital converter for receiving said first digital signal, and for sending said first digital signal to a host processor;

a memory, contained in said host processor, for storing voice analysis software, for storing a voice macro command recognition table, and for storing a voice command recognition table;

wherein said controller sends said first digital signal to said voice analysis software to convert said first digital signal into a first recognition pattern, and further wherein said host processor compares said first recognition pattern to at least one stored recognition pattern stored in said voice macro command recognition table, and when said first recognition pattern matches one of said at least one stored recognition patterns, said host processor retrieves a voice macro command file linked to said one of said at least one stored recognition patterns, and accesses at least one command number from said voice macro command file, and finds a matching command number in said voice command recognition table, wherein said host processor retrieves a first voice command file linked to said matching command number, and sends said voice command file to said controller which executes at least one instruction from said first voice command file.

22. The voice controlled capture system according to claim 21 wherein said voice analysis software performs a plurality of frequency domain transforms on said first digital signal, and further wherein said plurality of frequency domain transforms generates said first recognition pattern which is a spectral transform of said first digital signal.

23. The voice controlled capture system according to claim 21 wherein said at least one command number is at least one command text.

24. The voice controlled capture system according to claim 21 wherein said host processor accesses a plurality of command numbers from said voice macro command file, and finds a plurality of matching command numbers in said voice command recognition table, wherein said host processor retrieves a plurality of voice command files linked to said plurality of matching command numbers, and said controller executes a plurality of at least one instructions from said plurality of voice command files.

25. The voice controlled capture system according to claim 21 further comprising:

a macro recorder stored in said memory for creating a first voice macro command;

wherein, after said macro recorder is activated, at least one voice command voice input is received and converted by said voice pickup component into a second analog signal, and said analog-to-digital converter receives and converts said second analog signal into a second digital signal, and said controller sends said digital signal to said voice analysis software to convert said second digital signal into a second recognition pattern, wherein said host processor compares said second recognition pattern to at least one stored recognition pattern stored in said voice command recognition table, and when said second recognition pattern matches one of said at least one stored recognition patterns stored in said voice command recognition table, a first command number from said one of said at least one stored recognition patterns matching said second recognition pattern is stored in said memory, wherein said at least one command number matches said first command number, and further wherein a first voice input to name said first voice macro command is received and converted by said voice pickup component into a third analog signal, wherein said first voice macro command voice input matches said first voice input, and said analog-to-digital converter receives and converts said third analog signal into a third digital signal, and said controller sends said third digital signal to said voice analysis software to convert said third digital signal into a first created recognition pattern, wherein said first recognition pattern matches said first created recognition pattern, and said first created recognition pattern is stored in said voice macro command recognition table, and said first command number is stored in said voice macro command file, wherein said voice macro command file is linked to said first created recognition pattern.

26. The voice controlled capture system according to claim 25 wherein said first command number is a first command text, and said at least one command number is at least one command text.

27. The voice controlled capture system according to claim 25 wherein a plurality of voice command voice inputs are processed in creating said first voice macro command.

28. The voice controlled capture system according to claim 25 wherein a plurality of voice macro commands are created.

29. The voice controlled capture system according to claim 21 wherein said host processor accesses at least one digital signal from said voice macro command file instead of said at least one command number, and further wherein said at least one digital signal is converted into a second recognition pattern, and said second recognition pattern is compared to at least one stored recognition pattern stored in said voice command recognition table, and when said second recognition pattern matches one of said at least one stored recognition patterns stored in said voice command recognition table, a voice command file linked to said one of said at least one stored recognition patterns is retrieved, and said controller executes at least one instruction from said first voice command file.

30. A voice controlled capture device system comprising:

a voice controlled capture device, said voice controlled capture device further comprising a voice pickup component for receiving a first voice macro command voice input and converting said first voice macro command voice input into a first analog signal;

an analog-to-digital converter connected to said voice pickup component for receiving and converting said first analog signal into a first digital signal;

a controller connected to said analog-to-digital converter for receiving said first digital signal;

a host connection connected to said controller for sending said first digital signal; and a host computer system, said host computer system further comprising a communications interface in communication with said host connection for receiving said first digital signal from said host connection;

a memory connected to said communications interface for receiving and storing said first digital signal, and for storing voice analysis software, for storing a voice macro command recognition table, for storing a voice command recognition table, and for storing a capture device user interface;

wherein said capture device user interface calls said voice analysis software to convert said first digital signal into a first recognition pattern, and further wherein said capture device user interface compares said first recognition pattern to at least one stored recognition pattern stored in said voice macro command recognition table, and when said first recognition pattern matches one of said at least one stored recognition patterns, said capture device user interface retrieves a voice macro command file linked to said one of said at least one stored recognition patterns, and accesses at least one command number from said voice macro command file, and finds a matching command number in said voice command recognition table, wherein said capture device user interface retrieves a first voice command file linked to said matching command number, and sends at least one instruction from said first voice command file to said controller, wherein said controller executes said at least one instruction.

31. The voice controlled capture device system according to claim 30 wherein said voice analysis software performs a plurality of frequency domain transforms on said first digital signal, and further wherein said plurality of frequency domain transforms generates said first recognition pattern which is a spectral transform of said first digital signal.

32. The voice controlled capture device system according to claim 30 wherein said at least one command number is at least one command text.

33. The voice controlled capture device system according to claim 30 wherein said capture device user interface accesses a plurality of command numbers from said voice macro command file, and finds a plurality of matching command numbers in said voice command recognition table, wherein said capture device user interface retrieves a plurality of voice command files linked to said plurality of matching command numbers, and sends a plurality of at least one instructions from said plurality of voice command files to said controller, wherein said controller executes said plurality of at least one instructions.

34. The voice controlled capture device system according to claim 30 further comprising:

a create macro option within said capture device user interface for creating a first voice macro command;

wherein, after said create macro option is selected, at least one voice command voice input is received and converted by said voice pickup component into a second analog signal, and said analog-to-digital converter receives and converts said second analog signal into a second digital signal, and said controller sends said second digital to said memory in said host computer system through said host connection and through said communications interface, wherein said capture device user interface calls said voice analysis software to convert said second digital signal into a second recognition pattern, wherein said capture device user interface compares said second recognition pattern to at least one stored recognition pattern stored in said voice command recognition table, and when said second recognition pattern matches one of said at least one stored recognition patterns stored in said voice command recognition table, a first command number from said one of said at least one stored recognition patterns matching said second recognition pattern is stored in said dynamic memory, wherein said at least one command number matches said first command number, and further wherein a first voice input to name said first voice macro command is received and converted by said voice pickup component into a third analog signal, wherein said first voice macro command voice input matches said first voice input, and said analog-to-digital converter receives and converts said third analog signal into a third digital signal, and said controller sends said third digital to said memory in said host computer system through said host connection and through said communications interface, and said capture device user interface calls said voice analysis software to convert said third digital signal into a first created recognition pattern, wherein said first recognition pattern matches said first created recognition pattern, and said first created recognition pattern is stored in said voice macro command recognition table, and said first command number is stored in said voice macro command file, wherein said voice macro command file is linked to said first created recognition pattern.

35. The voice controlled capture device system according to claim 34 wherein said first command number is a first command text, and said at least one command number is at least one command text.

36. The voice controlled capture device system according to claim 34 wherein a plurality of voice command voice inputs are processed in creating said first voice macro command.

37. The voice controlled capture device system according to claim 34 wherein a plurality of voice macro commands are created.

38. The voice controlled capture device system according to claim 30 wherein said capture device user interface accesses at least one digital signal from said voice macro command file instead of said at least one command number, and further wherein said at least one digital signal is converted into a second recognition pattern, and said second recognition pattern is compared to at least one stored recognition pattern stored in said voice command recognition table, and when said second recognition pattern matches one of said at least one stored recognition patterns stored in said voice command recognition table, a voice command file linked to said one of said at least one stored recognition patterns is retrieved, and at least one instruction from said first voice command file is sent to said controller, wherein said controller executes said at least one instruction.

* * * * *